(12) United States Patent
Sasaki et al.

(10) Patent No.: US 7,328,954 B2
(45) Date of Patent: Feb. 12, 2008

(54) RECLINING MECHANISM OF A RECLINING SEAT

(75) Inventors: Kazutaka Sasaki, Kanagawa (JP); Hidehiko Fujioka, Kanagawa (JP)

(73) Assignee: Shiroki Corporation, Kanagawa-Ken (JP)

( * ) Notice: Subject to any disclaimer, the term of this patent is extended or adjusted under 35 U.S.C. 154(b) by 446 days.

(21) Appl. No.: 11/116,270

(22) Filed: Apr. 28, 2005

(65) Prior Publication Data
US 2005/0253439 A1      Nov. 17, 2005

(30) Foreign Application Priority Data
Apr. 30, 2004    (JP) .............................. 2004-136285

(51) Int. Cl.
*B60N 2/14* (2006.01)
(52) U.S. Cl. .................. 297/378.12; 297/367; 297/341
(58) Field of Classification Search ................ 297/367, 297/341, 378.12, 378.14
See application file for complete search history.

(56) References Cited

U.S. PATENT DOCUMENTS

| | | | | |
|---|---|---|---|---|
| 5,522,643 A | * | 6/1996 | Matsuura | 297/367 |
| 5,806,932 A | * | 9/1998 | Zhuang | 297/361.1 |
| 6,139,104 A | * | 10/2000 | Brewer | 297/353 |
| 6,199,953 B1 | * | 3/2001 | Chen | 297/367 |
| 6,290,297 B1 | * | 9/2001 | Yu | 297/378.12 |
| 6,739,668 B2 | * | 5/2004 | Coman et al. | 297/378.12 |
| 6,857,702 B2 | * | 2/2005 | Becker et al. | 297/341 |
| 2003/0080600 A1 | * | 5/2003 | Eppert | 297/367 |

FOREIGN PATENT DOCUMENTS

JP      2002-291564      10/2002

* cited by examiner

*Primary Examiner*—Peter R. Brown
(74) *Attorney, Agent, or Firm*—Millen, White, Zelano & Branigan, P.C.

(57) ABSTRACT

A reclining mechanism of a reclining seat including a seat back and a seat cushion includes a reclining lock mechanism which locks the seat back at an adjusted angular position and allows the seat back to be rotated forward/rearward relative to the seat cushion when manually operated; a reclining angle memory mechanism which remembers an angular position of a previous adjustment of the seat back and allows the seat back to be rotated forward relative to the seat cushion when manually operated independently of the reclining lock mechanism, wherein the reclining angle memory mechanism locks the seat back to the remembered angular position when the seat back is rotated rearward from the forward position; and a manual operation limiting device which prevents the reclining lock mechanism or the reclining angle memory mechanism from being operated when the other thereof is operated.

6 Claims, 13 Drawing Sheets

Fig. 3
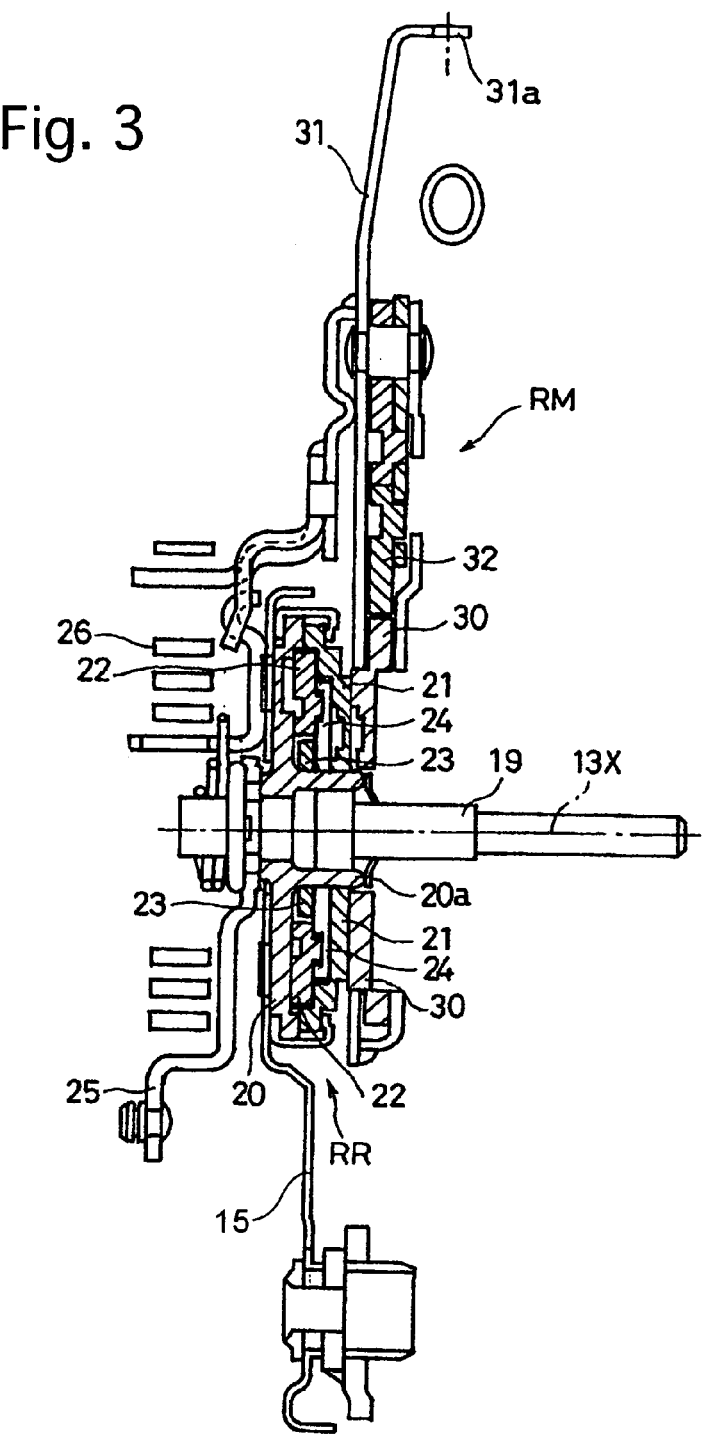
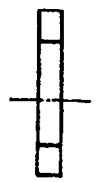

RECLINING MECHANISM OF A RECLINING SEAT

BACKGROUND OF THE INVENTION

1. Field of the Invention

The present invention relates to a reclining mechanism of a reclining seat, and more specifically relates to a reclining mechanism of a reclining seat which is provided with a reclining angle memory mechanism that remembers the angular position of the previous adjustment to the seat back after the seat back has been pivoted forward.

2. Description of the Related Art

Vehicle seats such as front vehicle seats are often constructed as reclining seats having a reclining mechanism which allows the seat back to be tilted rearward to any desired angle. Such reclining seats which are provided with a reclining angle memory mechanism that remembers the angular position of the previous adjustment to the seat back after the seat back has been pivoted forward in, e.g., a "walk-in" operation (in which the seat back of the front sliding seat is firstly tilted forward (pivoted forward), and subsequently the front sliding seat is moved fully forward) is performed to allow passengers to enter the rear seat or to allow cargo to be stored behind the front sliding seat are known in the art.

In such reclining seats having a reclining angle memory mechanism, there is a possibility of the reclining angle memory mechanism not functioning properly if a manual operation member for manually unlocking a reclining lock mechanism for locking the seat back and another manual operation member for manually actuating the reclining angle memory mechanism are operated at the same time. In other words, the reclining mechanism is provided with a ratchet which is rotatable relative to both the seat back and the seat cushion, the reclining lock mechanism either prevents the ratchet from rotating relative to the seat cushion (locked state) or allows the ratchet to rotate relative to the seat cushion (unlocked state), and the reclining angle memory mechanism either prevents the ratchet from rotating relative to the seat back (memory released state) or allows the ratchet to rotate relative to the seat back (memory operating state.). Due to this structure, if the reclining lock mechanism is put in the unlocked state while the reclining angle memory mechanism is put in the memory operating state, the ratchet becomes capable of rotating relative to both the seat cushion and the seat back, which may cause the angular position of the ratchet to move off the proper (remembered) angular position thereof.

SUMMARY OF THE INVENTION

The present invention provides a reclining mechanism of a reclining seat which is provided with a reclining lock mechanism and a reclining angle memory mechanism, wherein the reclining seat is further provided with a structure which eliminates positional error of the seat back caused by operating a lock-release operation member and a memory mechanism actuating member simultaneously.

According to an aspect of the present invention, a reclining mechanism of a reclining seat including a seat back and a seat cushion is provided, which is pivoted on the seat cushion so that an angular position of the seat back relative to the seat cushion is changed, the reclining mechanism including a reclining lock mechanism which locks the seat back at an adjusted angular position and allows the seat back to be rotated forward and rearward relative to the seat cushion when manually operated; a reclining angle memory mechanism which remembers an angular position of a previous adjustment of the seat back and allows the seat back to be rotated forward relative to the seat cushion when manually operated independently of the reclining lock mechanism, wherein the reclining angle memory mechanism locks the seat back to the remembered angular position when the seat back is rotated rearward from the forward position; and a manual operation limiting device which prevents one of the reclining lock mechanism and the reclining angle memory mechanism from being operated when the other of the reclining lock mechanism and the reclining angle memory mechanism is operated.

It is desirable for the reclining lock mechanism to include an unlocking operation member which is manually rotatable, wherein the reclining angle memory mechanism includes a memory-mechanism-actuating operation member which is manually rotatable. The manual operation limiting device includes a first rotation limiting member movable between a rotation limiting position, in which the first rotation limiting member limits rotation of the unlocking operation member and a rotation permitting position at which the first rotation limiting member allows the unlocking operation member to rotate; a first linkage mechanism which moves the first rotation limiting member to the rotation limiting position thereof in accordance with an operation of the memory-mechanism-actuating operation member; a second rotation limiting member movable between a rotation limiting position at which the second rotation limiting member limits rotation of the memory-mechanism-actuating operation member and a rotation permitting position at which the second rotation limiting member allows the memory-mechanism-actuating operation member to rotate; and a second linkage mechanism which moves the second rotation limiting member to the rotation limiting position thereof in accordance with an operation of the unlocking operation member.

It is desirable for the second linkage mechanism to include a rotatable relay member which is rotated in accordance with a rotation of the unlocking operation member, and for the first rotation limiting member to limit rotation of the rotatable relay member to limit rotation of the unlocking operation member when moved to the rotation limiting position.

It is desirable for the rotatable relay member to include a rotation limiting hole including a rotation permitting section which is elongated along a circular arc about a rotational axis of the rotatable relay member; and a rotation limiting section which is elongated in a substantially radial direction from the rotational axis of the rotatable relay member. The first rotation limiting member, which limits rotation of the rotatable relay member when moved to the rotation limiting position, includes a rotation limiting projection positioned in the rotation limiting hole. The first rotation limiting member allows the rotatable relay member to rotate when the rotation limiting projection is in the rotation permitting section, and limits rotation of the rotatable relay member when the rotation limiting projection is in the rotation limiting section.

In an embodiment, a reclining mechanism of a reclining seat including a seat back and a seat cushion is provided, which is pivoted on the seat cushion so that an angular position of the seat back relative to the seat cushion is changed, the reclining mechanism including an intermediate rotatable member provided between the seat cushion and the seat back to be rotatable relative to each of the seat cushion and the seat back; a reclining lock mechanism changeable between a rotation permitting state in which the reclining lock mechanism allows the intermediate rotatable member to rotate relative to the seat cushion and a rotation limiting state in which the reclining lock mechanism limits rotation of the intermediate rotatable member relative to the seat cushion; a reclining angle memory mechanism changeable between a rotation permitting state in which the reclining angle memory mechanism allows the intermediate rotatable member and the seat back to rotate relative to each other and a rotation limiting state in which the reclining angle memory mechanism limits relative rotation between the intermediate rotatable member and the seat back; and a manual operation limiting device which prevents one of the reclining lock mechanism and the reclining angle memory mechanism from being operated when the other of the reclining lock mechanism and the reclining angle memory mechanism is operated to be changed to the rotation permitting state thereof.

It is desirable for the reclining angle memory mechanism to operate to remember an angular position of a previous adjustment of the seat back is rotated relative to the seat cushion and the intermediate rotatable member.

According to the present invention, one of the reclining lock mechanism and the reclining angle memory mechanism is prevented from being operated when the other thereof is operated, which makes it possible to eliminate the aforementioned possibility of the reclining angle memory mechanism not functioning properly to thereby make it possible to adjust the reclining angle of the seat back with precision.

The present disclosure relates to subject matter contained in Japanese Patent Application No. 2004-136285 (filed on Apr. 30, 2004) which is expressly incorporated herein by reference in its entirety.

BRIEF DESCRIPTION OF THE DRAWINGS

The present invention will be described below in detail with reference to the accompanying drawings in which:

FIG. 3 is a cross sectional view taken along III-III line shown in FIG. 2;

DESCRIPTION OF THE PREFERRED EMBODIMENT

Figure 1:
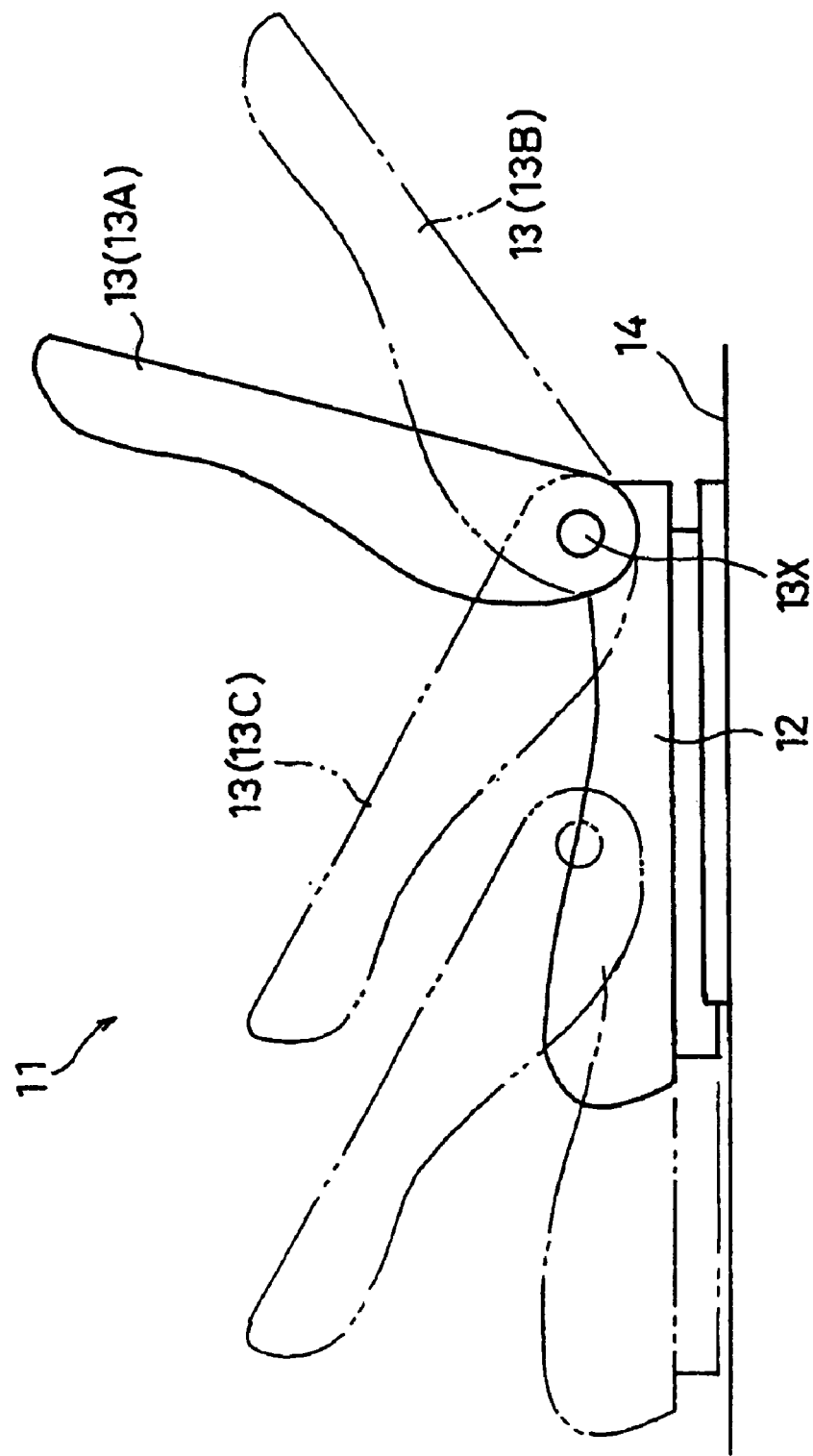
FIG. 1 is a side elevational view of an embodiment of a seat mechanism for vehicle according to the present invention.

FIG. 1 shows a front sliding seat (a front passenger seat or a driver's seat) 11 of a vehicle. The sliding seat 11 is provided with a seat cushion 12 for supporting the buttocks of a driver or a passenger, and a seat back 13 for supporting the back of a driver or a passenger. The sliding seat 11 is slidably guided in a forward/rearward direction relative to a vehicle floor 14 by a known sliding mechanism. The seat back 13 is pivoted (rotated) about a horizontal rotational axis 13X to be tiltable rearward in a range from an upright position 13A to a rearward-full-tilted position 13B. Additionally, the seat back 13 can be pivoted forward from the upright position to a forward-full-tilted position 13C about the rotational axis 13X.

Figure 2:
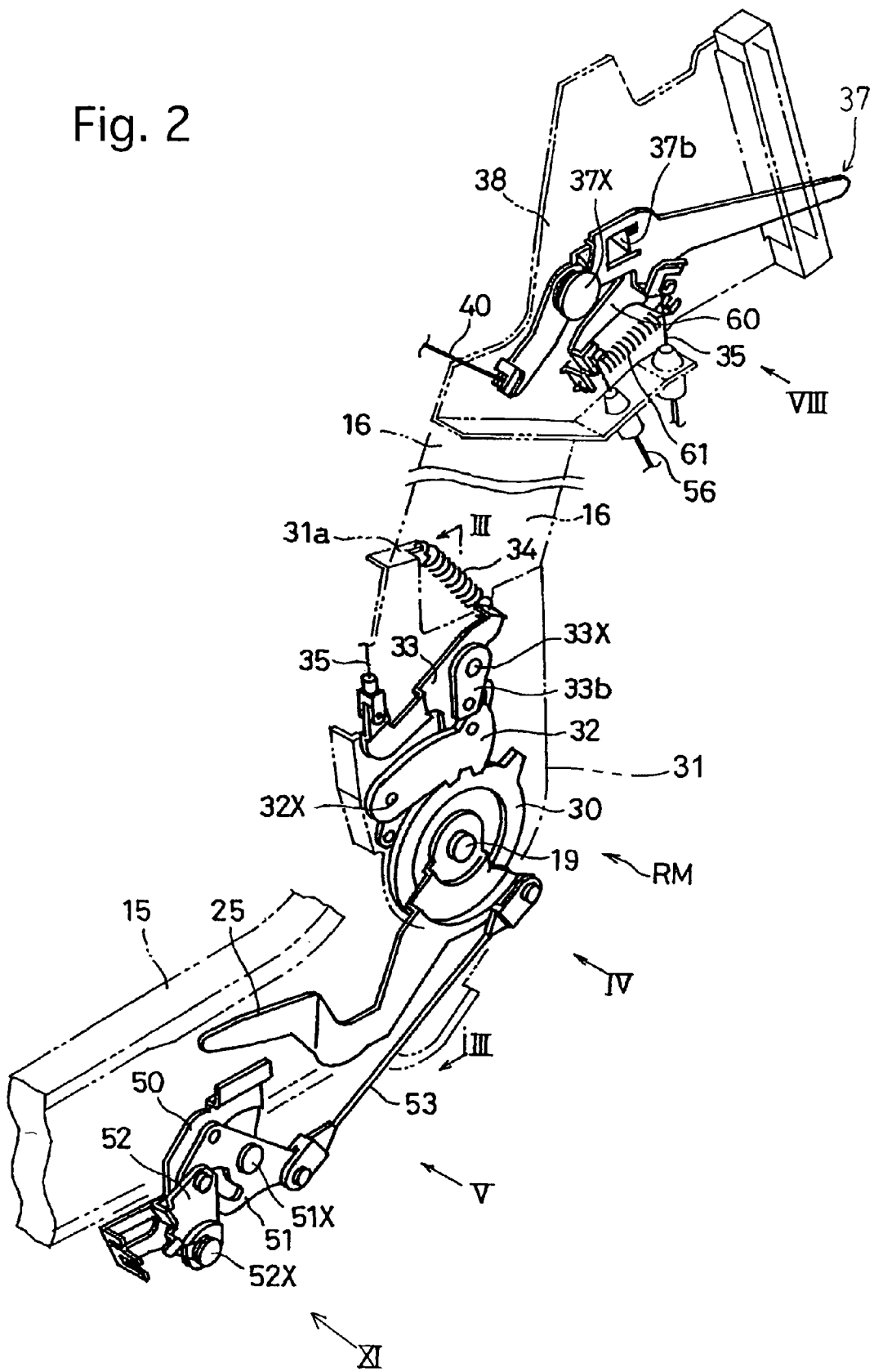
FIG. 2 is a perspective view of an internal structure of the seat mechanism shown in FIG. 1.

As shown in FIG. 2, the sliding seat 11 is provided therein on right and left sides of the seat cushion 12 with a pair of seat cushion frames 15 (only the left seat cushion frame appears in FIG. 2), respectively, and is further provided, in the sliding seat 11 on right and left sides of the seat back 13, with a pair of seat back frames 16 (only the left seat back frame 16 appears in FIG. 2), respectively. Although only the left-hand side structure of the seat mechanism of the sliding seat 11 will be discussed in the following description, the right-hand side structure of the seat mechanism of the sliding seat 11 is substantially the same as the left-hand side structure of the seat mechanism of the sliding seat 11 unless otherwise noted. In the following description, the terms "clockwise" and "counterclockwise" refer to a clockwise direction and a counterclockwise direction as viewed from the left-hand side of the sliding seat 11 (as viewed obliquely from the lower right side in FIG. 2), respectively.

As shown in FIG. 3, a base arm 20 is fixed to the seat cushion frame 15 in the vicinity of the rear end thereof, and a hinge pin 19 is rotatably fitted in a cylindrical bearing portion 20a which extends through the base arm 20. The axis of the hinge pin 19 is coincident with the rotational axis 13X. A lock plate 21 is fitted on an outer peripheral surface of the bearing portion 20a of the base arm 20 to be rotatable relative thereto about the rotational axis 13X. A pair of movable lock members 22 are supported by the base arm 20 around the outer peripheral surface of the bearing portion 20a to be movable in radial directions of the rotational axis 13X. The pair of movable lock members 22 are supported by the base arm 20 to be prevented from rotating about the rotational axis 13X relative to each other and to be linearly movable only in radial directions of the rotational axis 13X. A lock cam member 23 is positioned radially inside of the pair of movable lock members 22, and is supported on the bearing portion 20a of the base arm 20 to be integrally rotatable together with the hinge pin 19. A release plate 24 is supported on the bearing portion 20a of the base arm 20 between the lock plate 21 and the pair of movable lock members 22 to be rotatable together with the lock cam member 23.

Although not shown in detail, an outer edge of each movable lock member 22 and an inner edge of the lock plate 21 face each other, and are provided with an outer gear and an inner gear (both not shown), respectively, which are capable of being engaged with each other. When the lock cam member 23 rotates in a locking direction, the lock cam member 23 presses the pair of movable lock members 22 in directions to bring the outer gear of each movable lock member 22 into engagement with the inner gear of the lock plate 21 (i.e., in directions away from the rotational axis 13X). When the lock cam member 23 rotates in an unlocking direction opposite to the locking direction, the release plate 24, which integrally rotates together with the lock cam member 23, moves the pair of movable lock members 22 in directions to make the outer gear of each movable lock member 22 disengaged from the inner gear of the lock plate 21 (i.e., in directions approaching the rotational axis 13X). Since the pair of movable lock members 22 are supported to be movable only in radial directions of the hinge pin 19 relative to the base arm 20 (not to be rotatable relative to the base arm 20), the lock plate 21 is prevented from rotating relative to the base arm 20 in a state (locked state) where the outer gear of each movable lock member 22 and the inner gear of the lock plate 21 are engaged with each other. On the other hand, in a state (unlocked state) where the outer gear of each movable lock member 22 and the inner gear of the lock plate 21 are disengaged from each other, the lock plate 21 is rotatable relative to the base arm 20. A combination of the lock cam member 23 and the release plate 24 is biased in the locking direction by a lock spring (not shown), and can be rotated in the unlocking direction via the hinge pin 19 by turning a reclining angle adjusting lever (unlocking operation member) 25 which is fixed to the hinge pin 19. Specifically, the reclining angle adjusting lever 25 is rotatable clockwise and counterclockwise in a range between a lock position shown in FIGS. 5 and 7 and an unlock position shown in FIG. 6. The lock plate 21 and the pair of movable lock members 22 can be put in the unlocked state by rotating the reclining angle adjusting lever 25 clockwise from the lock position to the unlock position against the biasing force of the aforementioned lock spring. The hinge pin 19, the base arm 20, the lock plate 21, the pair of movable lock members 22, the lock cam member 23, the release plate 24 and the reclining angle adjusting lever 25 are elements of a reclining lock mechanism (seat back lock mechanism) RR for locking the seat back 13 to prevent the seat back 13 from tilting relative to the seat cushion 12. In other words, the reclining angle adjusting lever 25 serves as an unlocking operation member for releasing a locked state of the reclining lock mechanism RR.

A ratchet (intermediate rotatable member) 30 is coupled to the lock plate 21 without rotating relative to the lock plate 21. The ratchet 30 is fitted in a circular hole formed on an upper arm 31 to be rotatable relative to the upper arm 31 about the rotational axis 13X. The upper arm 31 is biased in a direction to pivot the seat back 13 forward by a return spring 26 (see FIG. 3), i.e., counterclockwise as viewed in FIGS. 4 through 7.

Figure 4:
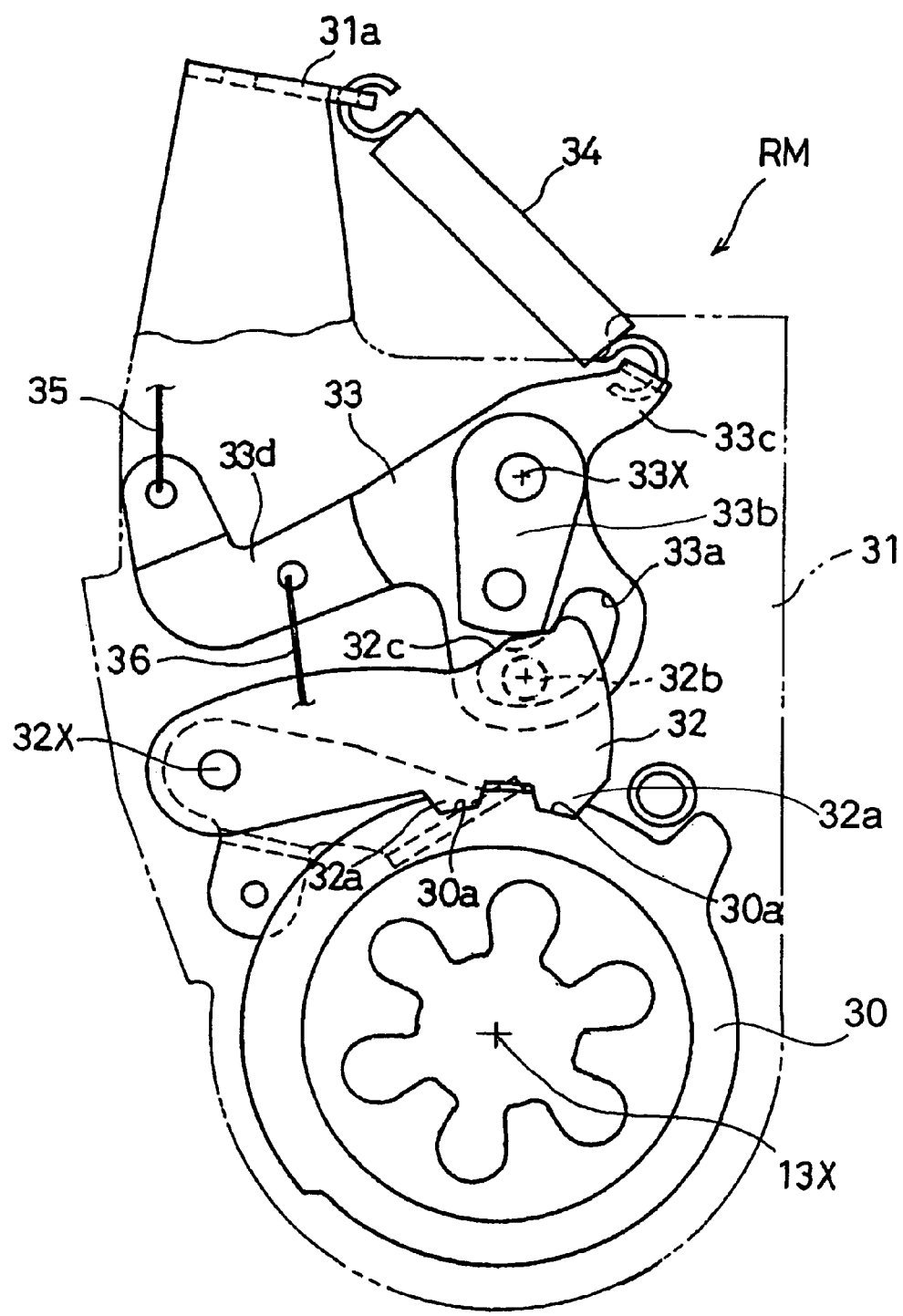
FIG. 4 is a side elevational view of a reclining angle memory mechanism shown in FIG. 2, viewed in a direction of an arrow IV shown in FIG. 2 with an upper arm being shown by two-dot chain lines.

As shown in FIG. 4, the ratchet 30 is provided on an outer edge thereof with a pair of memory recesses 30a. A pawl 32 is positioned above the ratchet 30, and is pivoted about a rotational pin 32X fixed to the upper arm 31. The pawl 32 is provided at a free end thereof with a pair of memory projections 32a which are engageable with the pair of memory recesses 30a. The pawl 32 is further provided with an association pin 32b and a cam surface 32c. The association pin 32b projects in a direction parallel to the rotational axis 13X, while the cam surface 32c is formed on a part of the outer edge of the pawl 32 on the opposite side from the pair of memory projections 32a of the pawl 32 (the upper side as viewed in FIG. 4).

A release lever (an element of a first linkage mechanism) 33 is provided at an upper position of the upper arm 31, and is pivoted about a rotational pin 33X. The release lever 33 is provided with a pin insertion hole 33a, a sub-arm 33b and a spring-engaging arm 33c. The sub-arm 33b integrally rotates together with the release lever 33. The association pin 32b of the pawl 32 is inserted into the pin insertion hole 33a, while the cam surface 32c is positioned on a rotational moving path of the sub-arm 33b. One end of a tension spring (biasing member) 34 is engaged with the spring-engaging arm 33c, while the other end of the tension spring 34 is engaged with a spring hook portion 31a of the upper arm 31 so that the release lever 33 is biased to rotate counterclockwise as viewed in FIG. 4 by the biasing force of the tension spring 34. This counterclockwise biasing direction of rotating the release lever 33 corresponds to a pressing direction of the sub-arm 33b onto the cam surface 32c. Therefore, when the release lever 33 is in a free state, the pawl 32 is held at an angular position shown in FIG. 4 at which the pair of memory projections 32a are made to engage in the pair of memory recesses 30a by the biasing force of the tension spring 34.

As shown in FIG. 4, the release lever 33 is further provided with a wire cable engaging arm 33d which is elongated in a radial direction of the rotational pin 33X. One end of a memory-operating wire cable (an element of the first linkage mechanism) 35 and one end of a link wire cable (an element of the first linkage mechanism) 36 are engaged with the wire cable engaging arm 33d from opposite directions. Drawing (pulling) the memory-operating wire cable 35 causes the release lever 33 to rotate clockwise with respect to FIG. 4 against the spring force of the tension spring 34. Thereupon, the sub-arm 33b moves away from the cam surface 32c to stop pressing the pawl 32, and at the same time, the release lever 33 presses (guides) the association pin 32b via the pin insertion hole 33a in a direction to move the association pin 32b away from the ratchet 30 (upward as viewed in FIG. 4), and accordingly the pawl 32 is rotated counterclockwise with respect to FIG. 4 to disengage the pair of memory projections 32a from the pair of memory recesses 30a.

Figure 8:
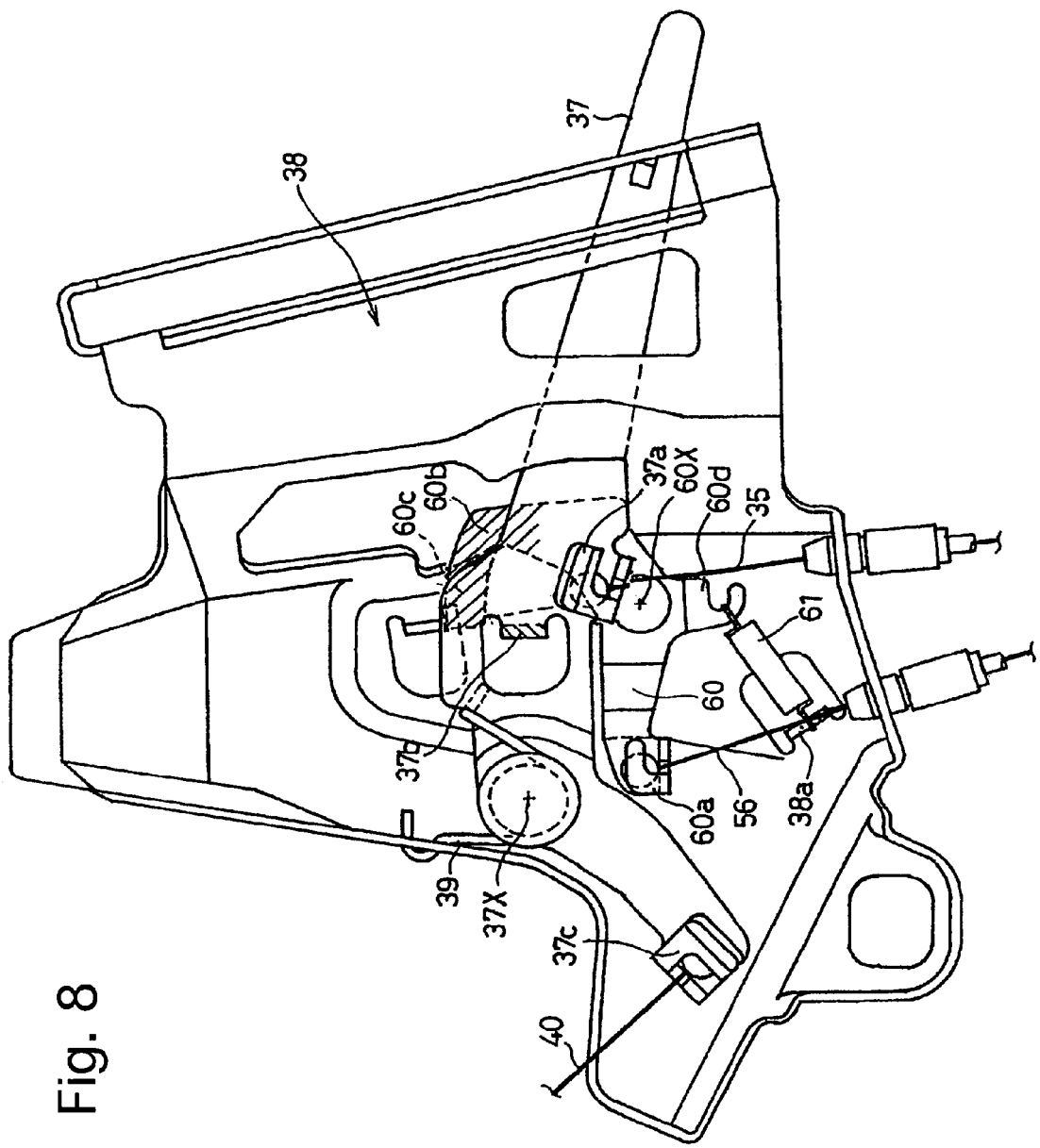
FIG. 8 is a side elevational view of a portion of the mechanism shown in FIG. 2 in the vicinity of a seat back frame, viewed in a direction of an arrow VIII shown in FIG. 2.
Figure 9:
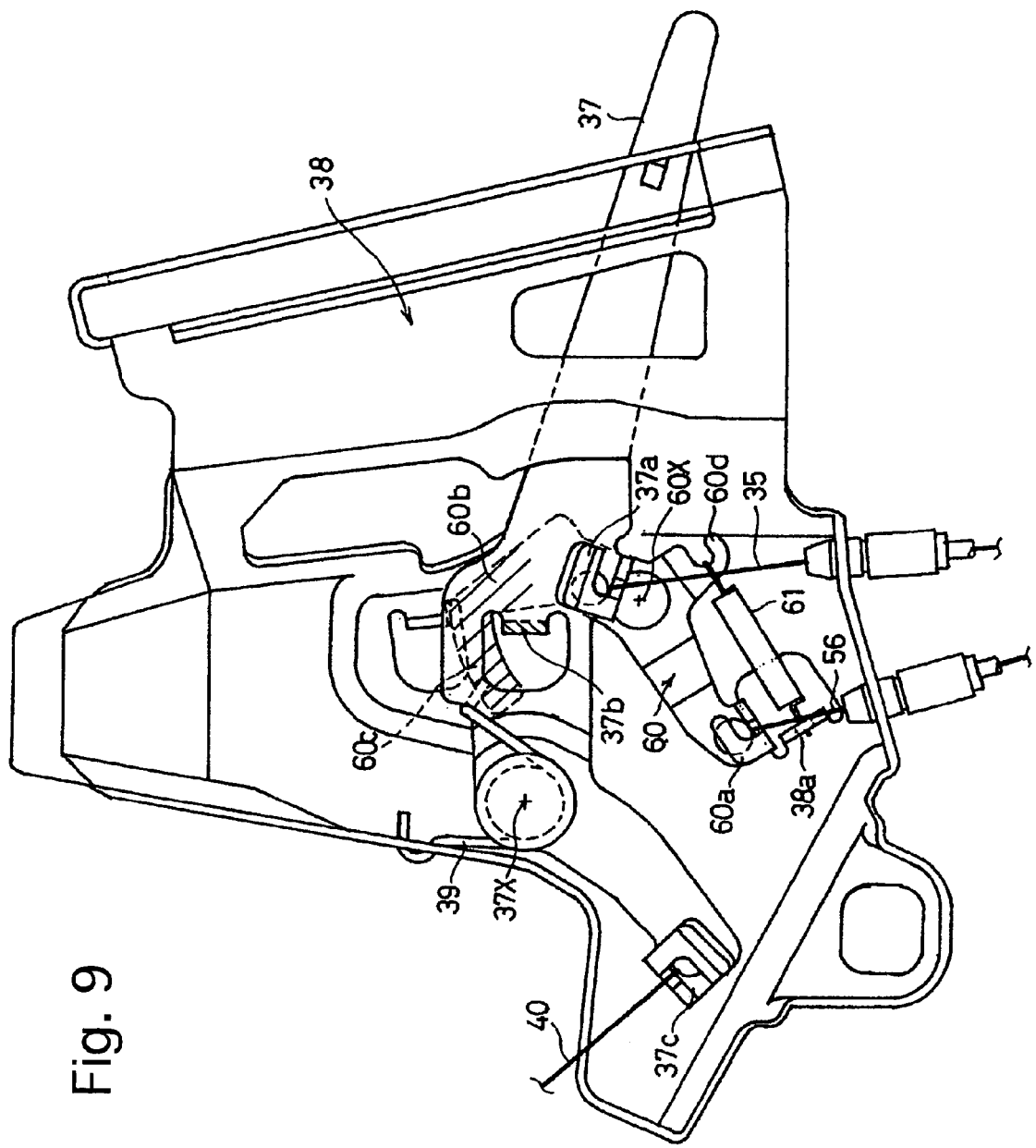
FIG. 9 is a view similar to that of FIG. 8, showing a state where the reclining angle adjusting lever is being operated from a state shown in FIG. 8.
Figure 10:
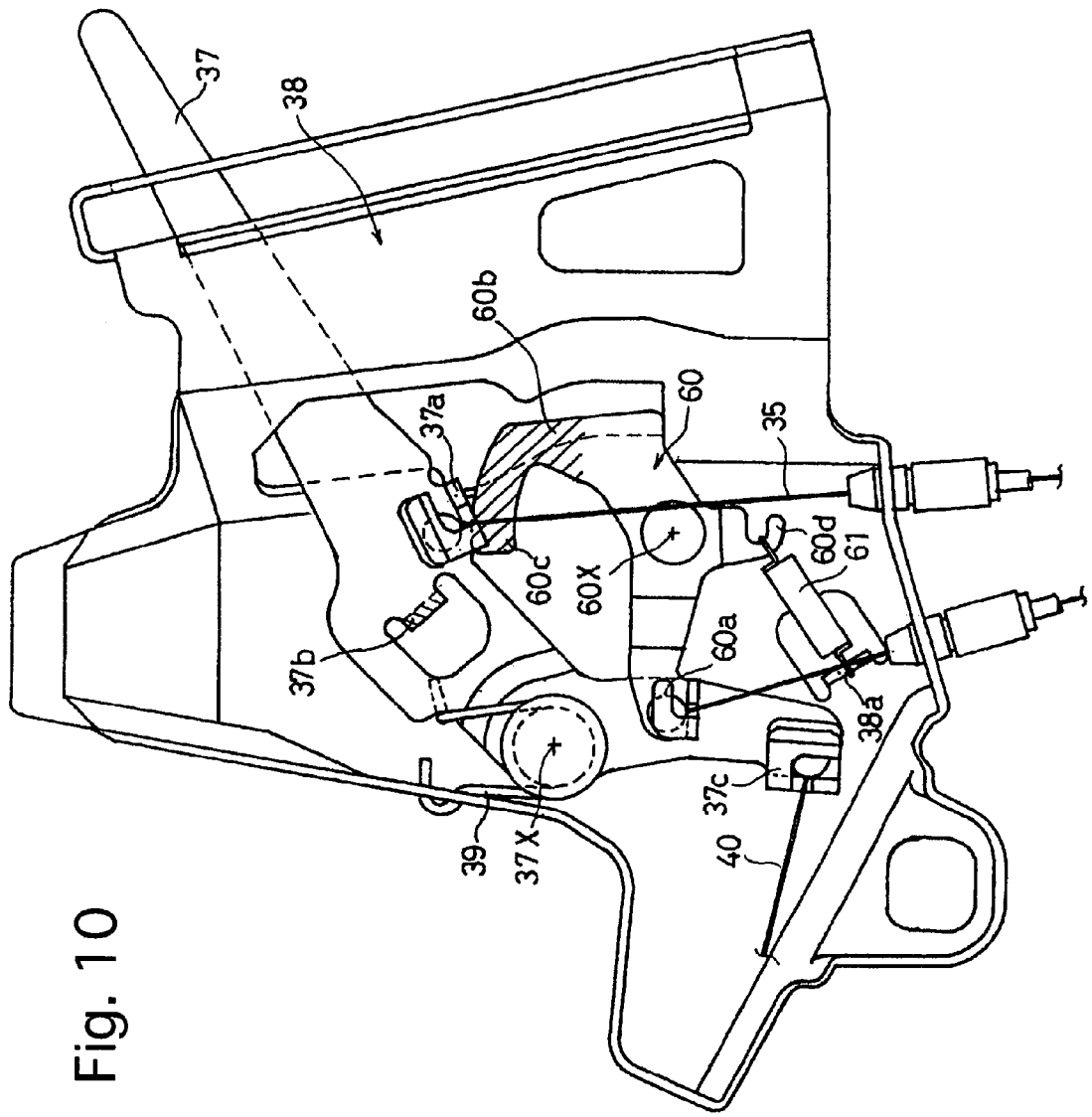
FIG. 10 is a view similar to that of FIG. 8, showing a state where the memory release lever is being operated from a state shown in FIG. 8.
Figure 11:
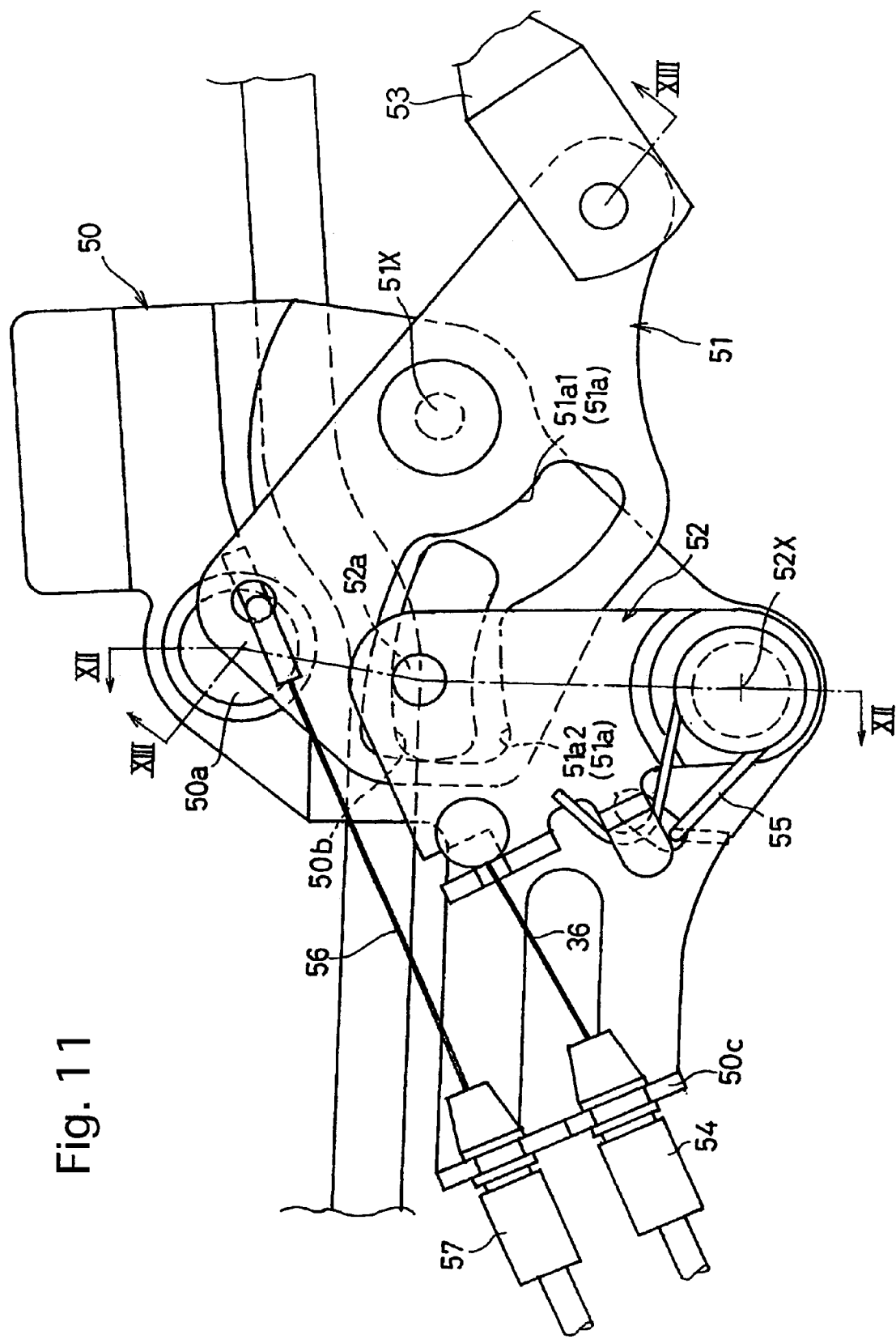
FIG. 11 is a side elevational view of a manual operation limiting device positioned on the reclining angle adjusting lever's side.

As shown in FIGS. 8 through 10, the other end of the memory-operating wire cable 35 is engaged with a wire cable engaging portion 37a of a memory mechanism operating lever (memory-mechanism-actuating operation member) 37 which is provided in the vicinity of the upper end of the seat back 13 on a back side thereof. The memory mechanism operating lever 37 is pivoted about a rotational pin 37X provided at a position some distance from the wire cable engaging portion 37a, and is rotatable between a memory released position shown in FIGS. 8 and 9 and a memory operating position shown in FIG. 10. The memory mechanism operating lever 37 is biased to rotate in a direction toward the memory released position by a torsion spring 39. The memory mechanism operating lever 37 is provided with a rotation limiting projection 37b which projects from the memory mechanism operating lever 37 in a direction substantially parallel to the axis of the rotational pin 37X (in a direction out of the page of FIG. 8).

Rotating the memory mechanism operating lever 37 from a memory released position shown in FIGS. 8 and 9 to a memory operating position shown in FIG. 10 causes the memory-operating wire cable 35 to be pulled by the memory mechanism operating lever 37, thus causing the release lever 33 to rotate clockwise with respect to FIG. 4 against the spring force of the tension spring 34. Thereupon, the pawl 32 is rotated counterclockwise with respect to FIG. 4 to disengage the pair of memory projections 32a from the pair of memory recesses 30a as mentioned above. A state of disengagement of the pair of memory projections 32a from the pair of memory recesses 30a corresponds to a memory operating state of a reclining angle memory mechanism RM in which the angular position of the previous adjustment to the seat back 13 is remembered by the reclining angle memory mechanism RM, while a state of engagement of the pair of memory projections 32a with the pair of memory recesses 30a corresponds to a memory released state of the reclining angle memory mechanism RM.

The upper arm 31, the pawl 32, the release lever 33 and the memory mechanism operating lever 37 are elements of the reclining angle memory mechanism RM which makes it possible for the seat back 13 to be pivoted forward with the reclining angle memory mechanism RM having been operated to remember the angular position of the previous adjustment to the seat back 13 after the seat back 13 has been pivoted forward. In other words, the memory mechanism operating lever 37 serves as a memory-mechanism-actuating operation member for making the reclining angle memory mechanism RM operate in the aforementioned memory operating state thereof. Although it can be said in a broad sense that the ratchet 30 serves as an element of the reclining angle memory mechanism RM, it can also be said that the ratchet 30 serves as an intermediate rotatable member provided between the seat cushion frame 15 and the seat back frame 16. Namely, the ratchet 30 can be switched by the reclining lock mechanism RR between an unlocked state in which the ratchet 30 is allowed to rotate relative to the seat cushion frame 15 (relative to the base arm 20) and a locked state in which the ratchet 30 is prevented from rotating relative to the seat cushion frame 15 (relative to the base arm 20). In addition, the ratchet 30 can be switched by the reclining angle memory mechanism RM between a memory operating state in which the ratchet 30 is allowed to rotate relative to the seat back frame 16 (relative to the upper arm 31) and a memory release state in which the ratchet 30 is prevented from rotating relative to the seat back frame 16 (relative to the upper arm 31).

Although it has been noted above that the right-hand side structure of the sliding seat 11 is substantially the same as the left-hand side structure of the sliding seat 11, the reclining angle adjusting lever 25 and the memory mechanism operating lever 37, each of which serves as a manual operation member, are provided only on the left side of the sliding seat 11 (on the side shown in FIG. 2). However, the hinge pin 19 that is provided on the left seat mechanism shown in FIG. 2 is interlocked with the hinge pin 19 provided on the right seat mechanism (not shown) so that rotating the reclining angle adjusting lever 25 in an unlocking direction thereof also causes the reclining lock mechanism RR provided on the right seat mechanism (not shown) to unlock the seat back 13. One end of a memory-operating wire cable 40 is fixed to a wire cable engaging arm 37c which is formed on the memory mechanism operating lever 37 at a position different from the position of the wire cable engaging portion 37a. The memory-operating wire cable 40 functions in the same manner as the memory-operating wire cable 35 on the right reclining angle memory mechanism RM (not shown) on the right side of the sliding seat 11.

The present embodiment of the sliding seat 11 is provided with a manual operation limiting device which prevents one of the reclining angle adjusting lever 25 and the memory mechanism operating lever 37 from being operated when the other thereof is operated. The structure of this manual operation limiting device will be discussed hereinafter.

As shown in FIGS. 5 through 7 and 11 through 13, a bracket 50 is fixed to the seat cushion frame 15 via a fixing pin 50a. The bracket 50 is provided with a pin guide hole 50b and a wire cable support portion 50c. A relay lever (an element of a second linkage mechanism/a rotatable relay member) 51 is pivoted about a rotational pin 51X fixed to the bracket 50, while a first rotation limiting lever (first rotation limiting member) 52 is pivoted about a rotational pin 52X fixed to the bracket 50. The pin guide groove 50b is formed as a slightly curved elongated hole having a circular arc shape substantially on a circle about the rotational pin 52X.

The relay lever 51 is provided with a rotation limiting hole 51a which extends through the relay lever 51 in a direction of the thickness thereof. The rotation limiting hole 51a of the relay lever 51 is provided with a rotation permitting section 51a1 in the shape of a substantially circular arc about the rotational pin 51X, and a rotation limiting section 51a2 which is elongated in a substantially radial direction of the rotational pin 51X. The rotation permitting section 51a1 and the rotation limiting section 51a2 are communicatively connected to each other. The relay lever 51 can be rotated relative to the bracket 50 clockwise and counterclockwise between a position shown in FIGS. 5, 7 and 11 in which the rotation limiting section 51a2 of the rotation limiting hole 51a is substantially aligned with the pin guide hole 50b as viewed in a direction parallel to the axis of the rotational axis 51X, and another position shown in FIG. 6 in which the rotation limiting section 51a2 of the rotation limiting hole 51a deviates upwards from the pin guide hole 50b so that only a portion of the rotation permitting section 51a1 (a portion on the right side of the rotation permitting section 51a1 with respect to FIG. 11) overlaps the pin guide hole 50b in a direction parallel to the axis of the rotational pin 51X.

Figure 12:
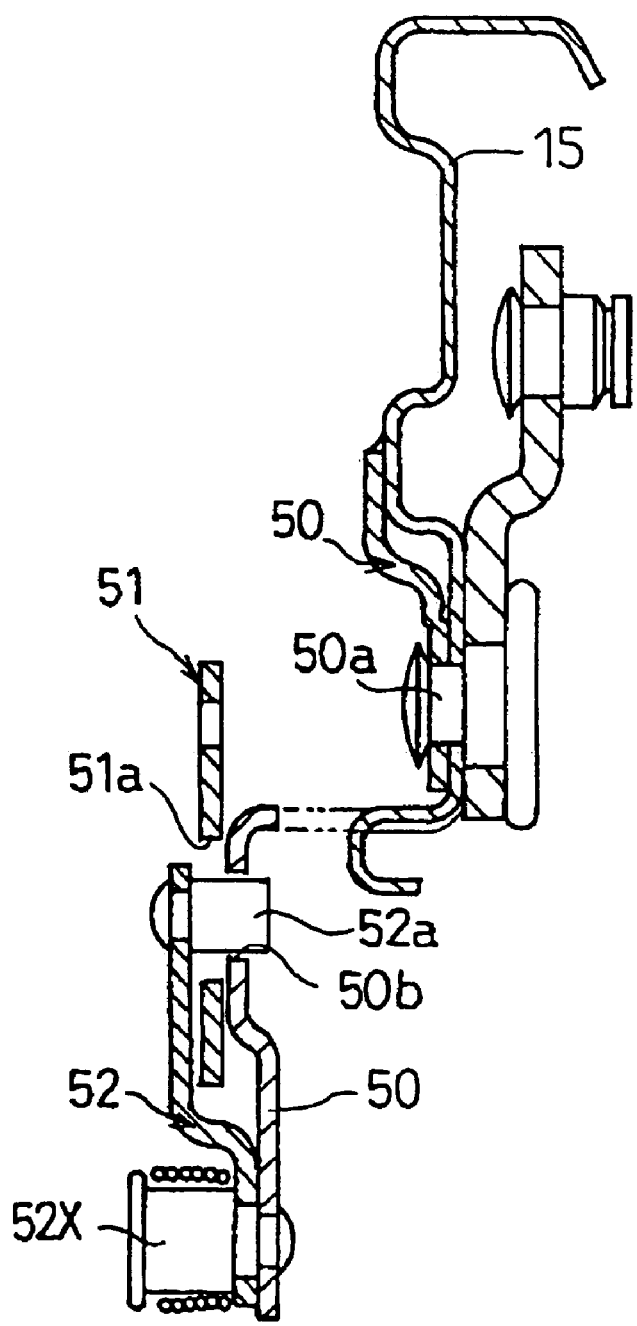
FIG. 12 is a cross sectional view taken along XII-XII line shown in FIG. 11.
Figure 13:
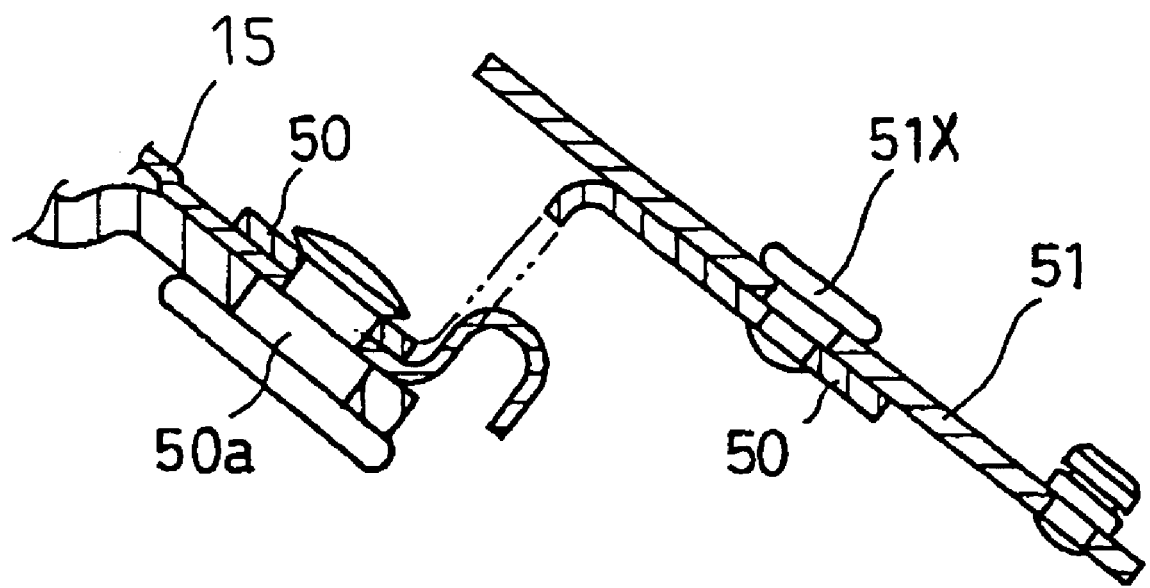
FIG. 13 is a cross sectional view taken along XIII-XIII line shown in FIG. 11.

The first rotation limiting lever 52 is provided with a control pin (rotation limiting projection) 52a which projects in a direction parallel to the rotational pin 52X, and is inserted into both the rotation limiting hole 51a and the pin guide hole 50b (see FIG. 12). As can be clearly seen in FIG. 11, the width of the rotation permitting section 51a1 of the rotation limiting hole 51a is substantially the same as the width of the pin guide groove 50b, whereas the width of the rotation limiting section 51a2 of the rotation limiting hole 51a is greater than the width of the pin guide groove 50b. The first rotation limiting lever 52 is biased to rotate in a direction (clockwise as viewed in FIGS. 5 through 7 and 11) to make the control pin 52a approach the rotational pin 51X by a torsion spring 55.

The other end of the link wire cable 36, one end of which is engaged with the wire cable engaging arm 33d as noted above, is engaged with the first rotation limiting lever 52. A portion of the link wire cable 36 in the vicinity of the first rotation limiting lever 52 is guided by a wire cable bracket 54 (see FIG. 11) which is supported by the wire cable support portion 50c.

A connection rod (an element of the second linkage mechanism/a link member) 53 is pivoted at one end thereof on the relay lever 51, and the other end of the connection rod 53 is pivoted on the reclining angle adjusting lever 25. One end of a link wire cable (an element of the second linkage mechanism) 56 is engaged with the relay lever 51 at a position on the opposite side of the rotational pin 51X from the pivoted end of the connection rod 53. A portion of the link wire cable 56 in the vicinity of the relay lever 51 is guided by a wire cable bracket 57 (see FIG. 11) which is supported by the wire cable support portion 50c. The other end of the link wire cable 56 is engaged with a wire cable engaging arm 60a of a second rotation limiting lever (second rotation limiting member) 60 provided in the vicinity of the memory mechanism operating lever 37 (see FIGS. 8 through 10).

The second rotation limiting lever 60 is pivoted about a rotational pin 60X fixed to the bracket 38, and is provided with a rotation limiting arm 60b which extends from the rotational pin 60X in a direction different from the extending direction of the wire cable engaging arm 60a. The rotation limiting arm 60b is provided at an end thereof with a bent end-portion 60c, and the rotation limiting arm 60b can rotate clockwise and counterclockwise between a rotation limiting position shown in FIG. 9 in which the bent end-portion 60c of the rotation limiting arm 60b is positioned on a moving path of the rotation limiting projection 37b of the memory mechanism operating lever 37, and a rotation permitting position shown in FIGS. 8 and 10 in which the bent end-portion 60c of the rotation limiting arm 60b is positioned out of the moving path of the rotation limiting projection 37b. The second rotational limiting lever 60 is biased to rotate in a direction to move the bent end-portion 60c toward the rotation permitting position by a tension coil spring 61, one and the other end of which are engaged with a spring hook portion 60d of the second rotation limiting lever 60 and a spring hook portion 38a of the bracket 38, respectively. Note that each of the bent end-portion 60c of the rotation limiting arm 60b and the rotation limiting projection 37b is hatched for the purpose of clarifying a positional relationship therebetween.

The release lever 33, the memory-operating wire cable 35, the link wire cable 36, the relay lever 51, the first rotation limiting lever 52, the connection rod 53 and the link wire cable 56 are elements of the manual operation limiting device, which prevents one of the reclining lock mechanism RR (which includes the reclining angle adjusting lever 25) and the reclining angle memory mechanism RM (which includes the memory mechanism operating lever 37) from being operated when the other is operated.

Operations of the seat mechanism of the sliding seat 11 will be discussed hereinafter. When neither the reclining angle adjusting lever 25 nor the memory mechanism operating lever 37 is operated, the manual operation limiting device is in a state shown in FIGS. 5 and 8. In this state shown in FIG. 5, the first rotation limiting lever 52 is positioned so that the control pin 52a is positioned in the rotation permitting section 51a1 of the rotation limiting hole 51a (substantially on the border between the rotation permitting section 51a1 and the rotation limiting section 51a2), and is held in this position by the spring force of the torsion spring 55. In this state, the relay lever 51 can be rotated clockwise with respect to FIG. 5 because the control pin 52a is in a position so as not to interfere with the relay lever 51 when the relay lever 51 rotates clockwise. Consequently, the reclining angle adjusting lever 25, which is connected to the relay lever 51 via the connection rod 53, is allowed to be manually rotated in the unlocking direction (clockwise with respect to FIG. 5). In addition, the second rotation limiting lever 60 is in a rotation limiting position in which the bent end-portion 60c of the rotation limiting arm 60b is positioned out of the moving path of the rotation limiting projection 37b as shown in FIG. 8. Therefore, the bent end-portion 60c of the rotation limiting arm 60b and the rotation limiting projection 37b do not interfere with each other to thereby allow the memory mechanism operating lever 37 to be manually rotated in a direction toward the memory operating position shown in FIG. 10 (counterclockwise with respect to FIG. 8).

Figure 5:
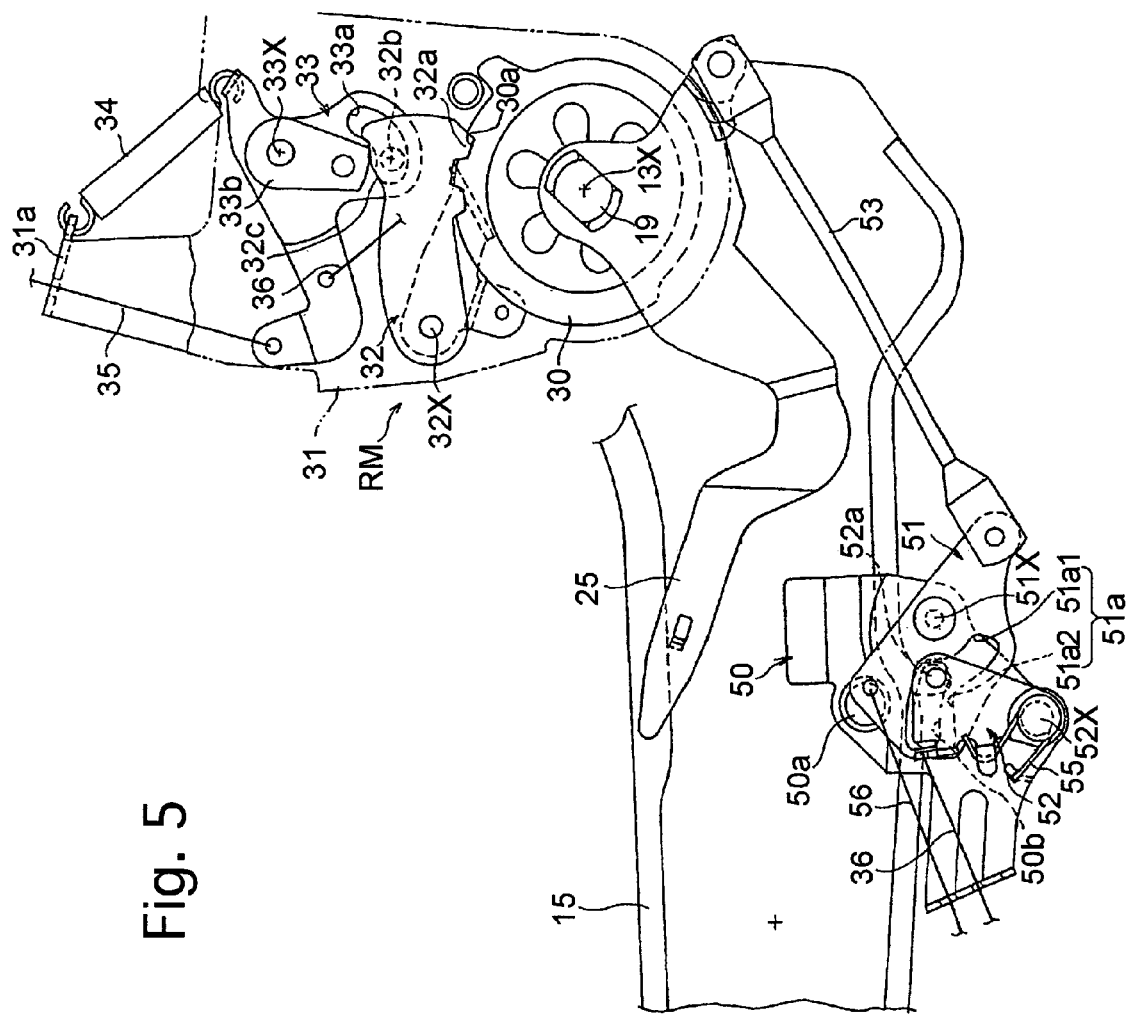
FIG. 5 is a side elevational view of a portion of the mechanism shown in FIG. 2 in the vicinity of the upper arm and a seat cushion frame in a state where neither a reclining angle adjusting lever nor a memory release lever is operated, viewed in a direction of an arrow V shown in FIG. 2.

In a state shown in FIGS. 5 and 8 where either the reclining angle adjusting lever 25 or the memory mechanism operating lever 37 is not operated, the aforementioned outer gear on the outer edge of each movable lock member 22 is engaged with the aforementioned inner gear on the inner edge of the lock plate 21 to prevent the lock plate 21 from rotating relative to the seat cushion frame 15 (the base arm 20). On the other hand, on the upper arm 31, the pair of memory projections 32a of the pawl 32 are engaged with the pair of memory recesses 30a of the ratchet 30 which is coupled to the lock plate 21. The release lever 33 is biased to rotate in a direction so as to cause the sub-arm 33b to press against the cam surface 32c so that the pair of memory projections 32a remain engaged in the pair of memory recesses 30a by the biasing force of the tension spring 34. Namely, the lock plate 21, the ratchet 30 and the upper arm 31 (the pawl 32) are integrally locked to be prevented from rotating about the rotational axis 13X to thereby prevent the seat back 13 from being pivoted relative to the seat cushion 12.

In a state shown in FIGS. 5 and 8 wherein neither the reclining angle adjusting lever 25 nor the memory mechanism operating lever 37 is operated, a manual rotation of the reclining angle adjusting lever 25 in the unlocking direction (clockwise with respect to FIG. 5) and a manual rotation of the memory mechanism operating lever 37 in a direction toward the memory operating position (shown in FIG. 10) can be selectively performed. Firstly, operations of the seat mechanism of the sliding seat 11 when the reclining angle adjusting lever 25 is operated to rotate in the unlocking direction will be discussed hereinafter.

Figure 6:
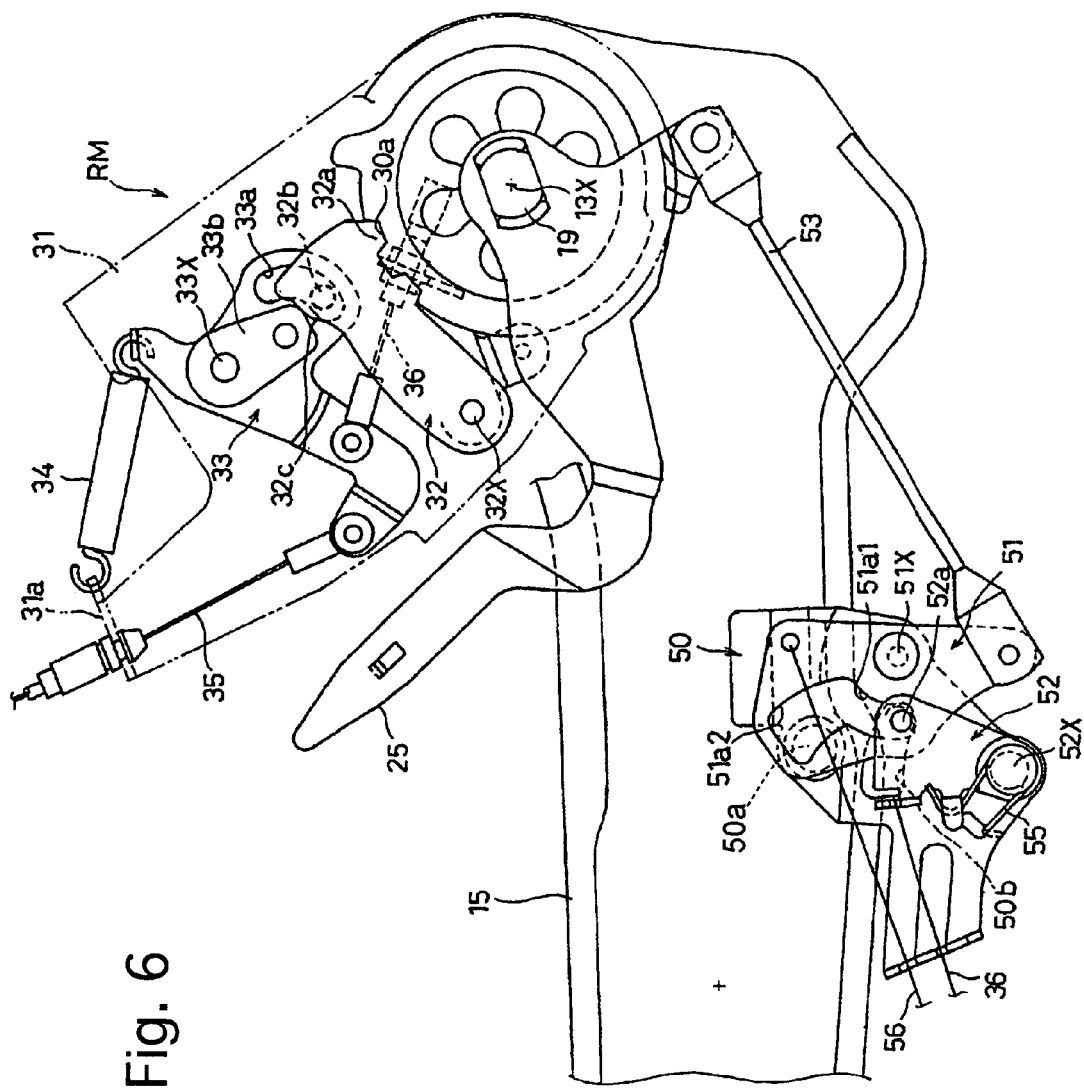
FIG. 6 is a view similar to that of FIG. 5, showing a state where the reclining angle adjusting lever is being operated from a state shown in FIG. 5.
Figure 7:
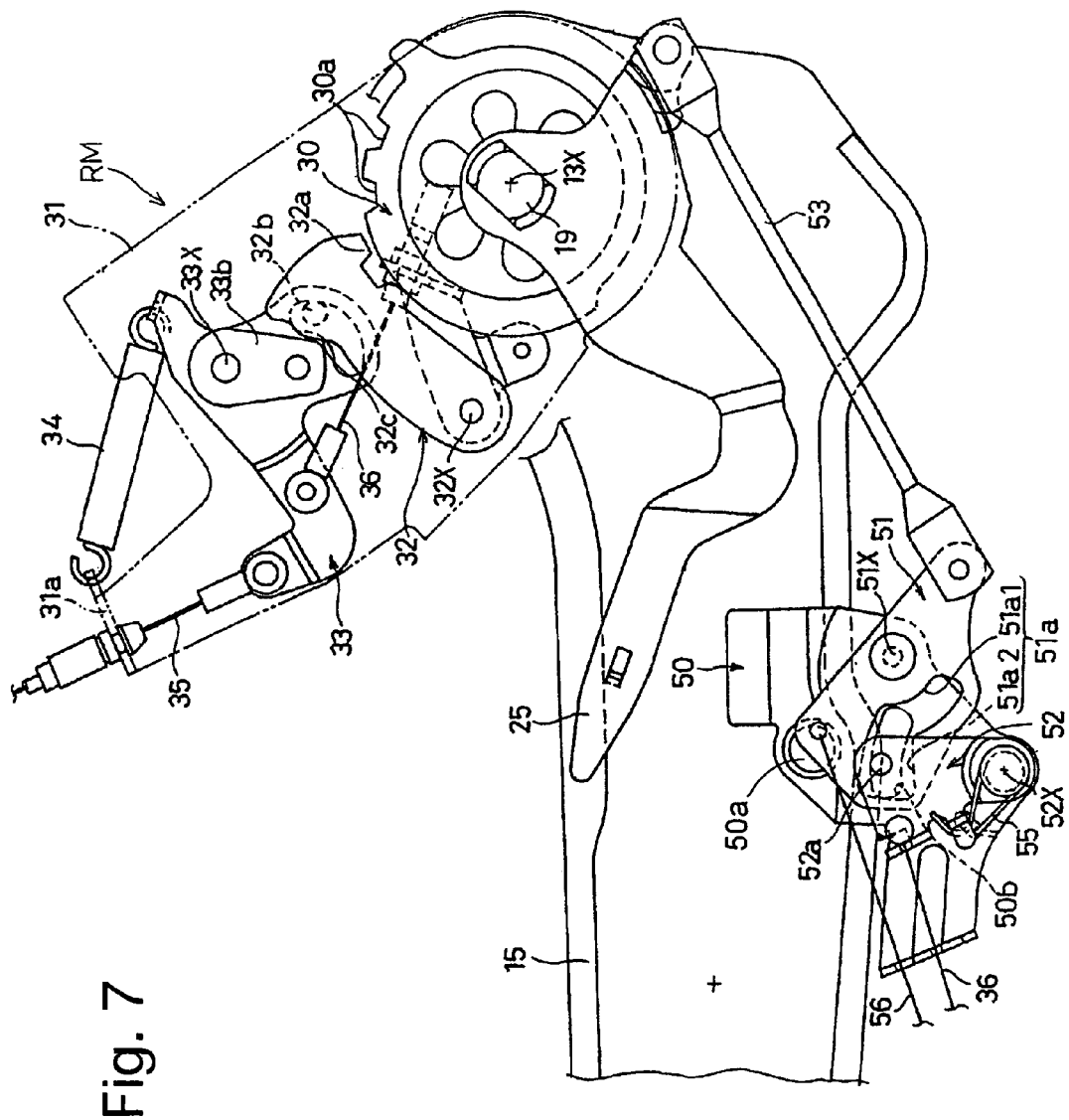
FIG. 7 is a view similar to that of FIG. 5, showing a state where the memory release lever is being operated from a state shown in FIG. 5.

Operating the reclining angle adjusting lever 25 as shown in FIG. 6 when the sliding seat 11 is in a normal seating state (i.e., when the sliding seat 11 is in the upright position or a reclined position) causes the lock cam member 23 to rotate in the unlocking direction via the hinge pin 19 to move the release plate 24, which rotates together with the lock cam member 23, in a direction to disengage the outer gear on the outer edge of each movable lock member 22 from the inner gear on the inner edge of the lock plate 21 (i.e., in a direction approaching the rotational axis 13X). On the other hand, the ratchet 30 is rendered integral with the upper arm 31 via the pawl 32 (the ratchet 30 is prevented from rotating relative to the upper arm 31) since the pair of memory projections 32a remain engaged in the pair of memory recesses 30a. Therefore, a combination of the lock plate 21, the ratchet 30 and the upper arm 31 becomes rotatable about the rotational axis 13X relative to the base arm 20. In this unlocked state, the reclining angle of the seat back 13 relative to the seat cushion 12 can be freely adjusted in a range from the upright position 13A to the rearward-full-tilted position 13B, which are shown in FIG. 1. After completion of this adjustment, operations reverse to the above described operations are performed to lock the seat back 13 again immediately after a driver or a passenger releases their hold from the reclining angle adjusting lever 25. If the seat back 13 is not manually held when the reclining angle adjusting lever 25 is rotated in the unlocking direction, the seat back 13 automatically moves forward to the forward-full-tilted position 13C by the spring force of the return spring 26. The reclining lock mechanism RR is structured so that the seat back 13 is not locked (the outer gear on the outer edge of each movable lock member 22 and the inner gear on the inner edge of the lock plate 21 are not engaged each other) even if a driver or a passenger releases their hold from the reclining angle adjusting lever 25 when the seat back 13 is in the forward-full-tilted position 13C.

In the above described operations for disengaging the outer gear on the outer edge of each movable lock member 22 from the inner gear on the inner edge of the lock plate 21 to unlock the seat back 13, rotating the reclining angle adjusting lever 25 in a direction to the unlock position shown in FIG. 6 from the position shown in FIG. 5 causes the relay lever 51 to rotate clockwise with respect to FIG. 5 via the connection rod 53 to the position shown in FIG. 6. At this time, the relay lever 51 can rotate without interfering with the control pin 52a because the control pin 52a is positioned in the rotation permitting section 51a1, and the control pin 52 is positioned at the tail end of the rotation permitting section 51a1 in a state shown in FIG. 6. This rotation of the relay lever 51 toward the position shown in FIG. 6 causes the link wire cable 56 to be pulled so that the second rotation limiting lever 60 rotates counterclockwise to the rotation limiting position shown in FIG. 9 from the rotation permitting position shown in FIG. 8 against the spring force of the tension coil spring 61. Thereupon, the bent end-portion 60c of the rotation limiting arm 60b moves onto the moving path of the rotation limiting projection 37b. In this state, the bent end-portion 60c of the rotation limiting arm 60b and the rotation limiting projection 37b interfere with each other to thereby prohibit the memory mechanism operating lever 37 from being manually rotated in a direction toward the memory operating position shown in FIG. 10 (counterclockwise with respect to FIG. 9).

Subsequently, operations of the seat mechanism of the sliding seat 11 when the angular position of the previous adjustment to the seat back 13 is remembered by the reclining angle memory mechanism RM by an operation of the memory mechanism operating lever 37 will be discussed hereinafter. Rotating the memory mechanism operating lever 37 counterclockwise from the memory released position shown in FIG. 8 to the memory operating position shown in FIG. 10 causes the memory-operating wire cable 35 to be pulled by the memory mechanism operating lever 37, thus causing the release lever 33 to rotate clockwise against the spring force of the tension spring 34. Thereupon, the pawl 32 is rotated counterclockwise to disengage the pair of memory projections 32a from the pair of memory recesses 30a. This disengagement of the pair of memory projections 32a from the pair of memory recesses 30a releases the engagement of the ratchet 30 with the upper arm 31, thus making it possible for the upper arm (left upper arm) 31 to rotate relative to the ratchet (left ratchet) 30. In addition, the memory-operating wire cable 40 is pulled by the counterclockwise operation of the memory mechanism operating lever 37 to make it possible for the right upper arm 31 (not shown) to rotate relative to the right ratchet 30 (not shown) in the reclining angle memory mechanism RM (not shown) on the right side of the sliding seat 11. On the other hand, the ratchet 30 remains prevented from rotating because the lock plate 21 and the pair of movable lock members 22 remain engaged with each other.

Therefore, the seat back 13 becomes capable of being pivoted via a rotation of the upper arm 31 relative to the ratchet 30 which is prevented from rotating. For instance, if a driver or a passenger releases their hold from the seat back 13 in this memory operating state, the seat back 13 automatically tilts forward to the forward-full-tilted position by the spring force of the return spring 26. Thereafter, if the seat back 13 is manually pivoted back toward the rearward-full-tilted position 13B, the seat back 13 is stopped from further moving rearward and is locked at the same angular position as that angular position of the previous adjustment to the seat back 13 which has been remembered by the reclining angle memory mechanism RM at the time the memory mechanism operating lever 37 is rotated from the memory released position to the memory operating position. More specifically, rotating the upper arm 31 (which has been tilted forward) clockwise in a direction toward its upright position relative to the ratchet 30, which is prevented from rotating, causes the pair of memory projections 32a to approach the pair of memory recesses 30a. Upon the pair of memory projections 32a reaching a point in which the pair of memory projections 32a face the pair of memory recesses 30a, the pawl 32 rotates by the spring force of the tension spring 34 to bring the pair of memory projections 32a into engagement with the pair of memory recesses 30a. This engagement of the pair of memory projections 32a with the pair of memory recesses 30a prevents the ratchet 30 and the pawl 32 from rotating relative to each other, and accordingly, the upper arm 31 again cannot be pivoted relative to the base arm 20. This angular position of the seat back 13 at which the seat back 13 is prevented from rotating relative to the seat cushion 12 is the angular position of the seat back 13 which is remembered by the above operation of the memory mechanism operating lever 37 because no rotation of the ratchet 30 relative to the seat cushion frame 15 has occurred since the commencement of the manual operation of the memory mechanism operating lever 37.

In the reclining angle memory mechanism RM, if the release lever 33 is rotated clockwise with respect to the position shown in FIG. 4 when the reclining angle memory mechanism RM is in the memory operating state, the link wire cable 36, one end of which is engaged with the release lever 33, is pulled. This pulling operation of the link wire cable 36 causes the first rotation limiting lever 52 to rotate counterclockwise from the position shown in FIG. 5 to the position shown in FIG. 7 against the spring force of the torsion spring 55 because the other end of the link wire cable 36 is engaged with the first rotation limiting lever 52. Thereupon, the control pin 52a moves away from the rotation permitting section 51a1 of the rotation limiting hole 51a to enter the rotation limiting section 51a2 (to move leftward as viewed in FIG. 7). In this state, the control pin 52a is prevented from moving vertically as viewed in FIG. 7 due to the opposite side edges of the rotation limiting section 51a2; namely, the relay lever 51 is prevented from rotating. This prevention of rotation of the relay lever 51 acts on the reclining angle adjusting lever 25 via the connection rod 53 so that the reclining angle adjusting lever 25 cannot be manually rotated in the unlocking direction.

The width of the rotation limiting section 51a2 of the rotation limiting hole 51a is greater than the width of the rotation permitting section 51a1 of the rotation limiting hole 51a, and some clearance (play) is formed between the rotation limiting section 51a2 and the control pin 52a. Even if a slight positional error exists between the manual operation system on the reclining angle adjusting lever 25 side and the manual operation system on the memory mechanism operating lever 37 side, such a positional error can be absorbed by the clearance (play) between the rotation limiting section 51a2 and the control pin 52a.

As can be clearly understood from the above description, in the above illustrated embodiment of the sliding seat 11, the reclining angle adjusting lever 25 is prevented from being operated to thereby make it impossible to release the locked state of the reclining lock mechanism RR when the memory mechanism operating lever 37 is operated to move from the memory released position to the memory operating position. Conversely, when the locked state of the reclining lock mechanism RR is released by operating the reclining angle adjusting lever 25, the memory mechanism operating lever 37 is prevented from being operated to thereby prevent the memory mechanism operating lever 37 from being operated to move from the memory released position to the memory operating position. This prevents the ratchet 30 from freely rotating relative to both the pair of movable lock members 22, which serve as elements of the reclining lock mechanism RR, and the pawl 32, which serves as an element of the reclining angle memory mechanism RM, at the same time. Consequently, the seat back 13 can be precisely returned to the remembered angular position (the angular position of the previous adjustment to the seat back) without any positional error after the seat back 13 has been pivoted forward.

The relay lever 51 serves as an element of the second linkage mechanism for transferring an operating physical force of the reclining angle adjusting lever 25 to the second rotation limiting lever 60, and serves as a member which is prevented from rotating due to the first rotation limiting lever 52 during operation of the memory mechanism operating lever 37. Making an element (the relay lever 51) of such a linkage mechanism serve as a multi-functional element in such a manner makes it possible to reduce the number of elements of the seat mechanism to simplify the structure thereof.

Although the present invention has been described above with reference to one embodiment of the seat mechanism, obvious changes may be made in the specific embodiment of the present invention described herein, such modifications being within the spirit and scope of the invention claimed. It is indicated that all matter contained herein is illustrative and does not limit the scope of the present invention. For instance, although an operating physical force of the reclining angle adjusting lever 25 is transferred to the second rotation limiting lever 60 via the second linkage mechanism that is composed of the relay lever 51 and the link wire cable 56 and an operating physical force of the memory mechanism operating lever 37 is transferred to the first rotation limiting lever 52 via the first linkage mechanism that is composed of the memory-operating wire cable 35, the release lever 33 and the link wire cable 36 in the above illustrated embodiment, each of the first linkage mechanism and the second linkage mechanism can be another type of linkage mechanism having a different structure. As an example of such a structure, each manual operation lever (the reclining angle adjusting lever 25 and the memory mechanism operating lever 37) can be connected to the associated rotation limiting lever (the first rotation limiting lever 52 or the second rotation limiting lever 60) directly via a link wire cable.

What is claimed is:

1. A reclining mechanism of a reclining seat including a seat back and a seat cushion which is pivoted on said seat cushion so that an angular position of said seat back relative to said seat cushion is changed, said reclining mechanism comprising:
    a reclining lock mechanism which locks said seat back at an adjusted angular position and allows said seat back to be rotated forward and rearward relative to said seat cushion when manually operated;
    a reclining angle memory mechanism which remembers an angular position of a previous adjustment of said seat back and allows said seat back to be rotated forward relative to said seat cushion when manually operated independently of said reclining lock mechanism, wherein said reclining angle memory mechanism locks said seat back to said remembered angular position when said seat back is rotated rearward from said forward position; and
    a manual operation limiting device which prevents one of said reclining lock mechanism and said reclining angle memory mechanism from being operated when the other of said reclining lock mechanism and said reclining angle memory mechanism is operated.

2. The reclining mechanism according to claim 1, wherein said reclining lock mechanism comprises an unlocking operation member which is manually rotatable,
    wherein said reclining angle memory mechanism comprises a memory-mechanism-actuating operation member which is manually rotatable,
    wherein said manual operation limiting device comprises:
    a first rotation limiting member movable between a rotation limiting position, in which said first rotation limiting member limits rotation of said unlocking operation member and a rotation permitting position at which said first rotation limiting member allows said unlocking operation member to rotate;
    a first linkage mechanism which moves said first rotation limiting member to said rotation limiting position thereof in accordance with an operation of said memory-mechanism-actuating operation member;
    a second rotation limiting member movable between a rotation limiting position at which said second rotation limiting member limits rotation of said memory-mechanism-actuating operation member and a rotation permitting position at which said second rotation limiting member allows said memory-mechanism-actuating operation member to rotate; and
    a second linkage mechanism which moves said second rotation limiting member to said rotation limiting position thereof in accordance with an operation of said unlocking operation member.

3. The reclining mechanism according to claim 2, wherein said second linkage mechanism comprises a rotatable relay member which is rotated in accordance with a rotation of said unlocking operation member, and
    wherein said first rotation limiting member limits rotation of said rotatable relay member to limit rotation of said unlocking operation member when moved to said rotation limiting position.

4. The reclining mechanism according to claim 3, wherein said rotatable relay member comprises a rotation limiting hole including:
    a rotation permitting section which is elongated along a circular arc about a rotational axis of said rotatable relay member; and
    a rotation limiting section which is elongated in a substantially radial direction from said rotational axis of said rotatable relay member,
    wherein said first rotation limiting member, which limits rotation of said rotatable relay member when moved to said rotation limiting position, comprises a rotation limiting projection positioned in said rotation limiting hole, and
    wherein said first rotation limiting member allows said rotatable relay member to rotate when said rotation limiting projection is in said rotation permitting section, and limits rotation of said rotatable relay member when said rotation limiting projection is in said rotation limiting section.

5. A reclining mechanism of a reclining seat including a seat back and a seat cushion which is pivoted on said seat cushion so that an angular position of said seat back relative to said seat cushion is changed, said reclining mechanism comprising:
- an intermediate rotatable member provided between said seat cushion and said seat back to be rotatable relative to each of said seat cushion and said seat back;
- a reclining lock mechanism changeable between a rotation permitting state in which said reclining lock mechanism allows said intermediate rotatable member to rotate relative to said seat cushion and a rotation limiting state in which said reclining lock mechanism limits rotation of said intermediate rotatable member relative to said seat cushion;
- a reclining angle memory mechanism changeable between a rotation permitting state in which said reclining angle memory mechanism allows said intermediate rotatable member and said seat back to rotate relative to each other and a rotation limiting state in which said reclining angle memory mechanism limits relative rotation between said intermediate rotatable member and said seat back; and
- a manual operation limiting device which prevents one of said reclining lock mechanism and said reclining angle memory mechanism from being operated when the other of said reclining lock mechanism and said reclining angle memory mechanism is operated to be changed to said rotation permitting state thereof.

6. The reclining mechanism according to claim 5, wherein said reclining angle memory mechanism operates to remember an angular position of a previous adjustment of said seat back when said seat back is rotated relative to said seat cushion and said intermediate rotatable member.

* * * * *